(12) United States Patent
Testi

(10) Patent No.: US 6,273,371 B1
(45) Date of Patent: Aug. 14, 2001

(54) METHOD FOR INTERFACING A PILOT WITH THE AERODYNAMIC STATE OF THE SURFACES OF AN AIRCRAFT AND BODY INTERFACE TO CARRY OUT THIS METHOD

(76) Inventor: Marco Testi, Via Ferrer. 78- 157025, Piombino Li (IT)

( * ) Notice: Subject to any disclaimer, the term of this patent is extended or adjusted under 35 U.S.C. 154(b) by 0 days.

(21) Appl. No.: 09/438,086

(22) Filed: Nov. 10, 1999

(30) Foreign Application Priority Data

Nov. 11, 1998 (IT) ................................................. PI98A0075

(51) Int. Cl.[7] .......................... B64C 13/04; B64C 13/46; B64C 13/16; B64C 21/00; G05D 1/00; G06G 7/00; G06G 7/76; G06F 19/00; G06F 7/70
(52) U.S. Cl. ............................ 244/223; 244/194; 244/195; 244/203; 244/204; 701/14
(58) Field of Search ........................................ 244/194, 195, 244/223, 203, 204; 340/945; 701/3, 14

(56) References Cited

U.S. PATENT DOCUMENTS

| | | | |
|---|---|---|---|
| 3,902,687 | * 9/1975 | Hightower | 244/77 |
| 4,484,191 | * 11/1984 | Vavra | 340/965 |
| 4,516,747 | * 5/1985 | Lurz | 244/204 |
| 4,814,764 | * 3/1989 | Middleton | 340/967 |
| 4,932,610 | * 6/1990 | Maestrello | 244/203 |
| 4,989,810 | * 2/1991 | Meier et al. | 244/208 |
| 5,062,594 | * 11/1991 | Repperger | 244/175 |
| 5,146,083 | * 9/1992 | Zuckerwar et al. | 250/227.21 |
| 5,319,608 | * 6/1994 | Katz | 361/1 |
| 5,359,663 | * 10/1994 | Katz | 381/71 |
| 5,365,490 | * 11/1994 | Katz | 367/1 |
| 5,738,310 | * 4/1998 | Rollet et al. | 244/195 |
| 5,746,398 | * 5/1998 | Rollet et al. | 244/223 |
| 6,070,829 | * 6/2000 | Bellera et al. | 244/17.13 |

* cited by examiner

Primary Examiner—Charles T. Jordan
Assistant Examiner—Christian M. Best
(74) Attorney, Agent, or Firm—The Bilicki Law Firm, P.C.

(57) ABSTRACT

Method, apparatus and sensors for directly interfacing a pilot (1) with the aerodynamic state of the surfaces of an aircraft, in particular allowing the direct sensorization of the conditions of the aerodynamic surfaces during the flight. The pilot (1) wears one or several "data suits" (2), for example on the arm, on the trunk, on the face or on the hands. The information on the boundary layer state is detected by a plurality of sensors (3) located on the different aerodynamic surfaces. A body interface (4) comprising a console (5), a multi-channel conditioning unit (6) and a processor (7) for the data acquisition are connected to the data suit (2). The data suit uses tactile sensations to transmit to the pilot, data responsive to critical airflow conditions at the sensors (3). In an aircraft with many aerodynamic surfaces the pilot can detect directly any arising critical condition. The array of sensors (3) can, be arranged on different aerodynamic surfaces and in different areas of a same aerodynamic surface. Therefore, the data suit (2) has tactile sensations actuators sorted in groups so that each group corresponds to a different surface.

11 Claims, 12 Drawing Sheets

METHOD FOR INTERFACING A PILOT WITH THE AERODYNAMIC STATE OF THE SURFACES OF AN AIRCRAFT AND BODY INTERFACE TO CARRY OUT THIS METHOD

DESCRIPTION

FIELD OF THE INVENTION

The present invention relates to a method for interfacing a pilot with the aerodynamic state of the surfaces of an aircraft, in particular relating to the conditions of the boundary layer on the aerodynamic surfaces during the flight.

Furthermore the invention relates to a body interface provided on an aircraft comprising sensors which can be used on the aircraft surfaces to carry out this method.

BACKGROUND OF THE INVENTION

The existing interfacing systems of a pilot with the controls of an aircraft mainly are visual signals that come from the control board and from the outside. Furthermore, the pilot receives many sound signals in the form of radio communication and sounds coming always from the control board and from the aircraft.

Therefore, the visual and acoustic "channels" are almost saturated of data that are usually administered by an expert pilot.

On the other hand, in particular for pilots that conduct difficult flights, direct feedback is necessary from peculiar aerodynamic situations that can cause loss of control of the aircraft or that in any case need to be operated with skill to obtain certain results.

Furthermore, continuous monitoring systems of the boundary layer state present on the aerodynamic surfaces of an aircraft are not known in a way that are interfaced directly with the pilot.

SUMMARY OF THE INVENTION

It is an object of the present invention to provide a method for interfacing a pilot with the surfaces of an aircraft, in particular suitable to allow the a direct sensorization of the boundary layer conditions of the aerodynamic surfaces during the flight, by means of tactile senses, which after training are felt instinctively, in addition to visual and acoustic sensations already saturated by other data necessary for piloting an aircraft.

It is another object of the invention to provide a body interface which can be used by the pilot to carry out this method that allows the direct recognition of the boundary layer state of the aerodynamic surfaces.

It is a further object of the invention to provide sensors which can be used on the surfaces of the aircrafts to carry out this method that are suitable to be arranged on the surfaces of an aircraft and to be easily linked to a body interface, and which, in particular:

- are not complex to manufacture;
- have output signals clearly distinct for laminar or turbulent flow,
- allow filtering the structural vibrations of the surfaces to which they are associated, for distinguishing them from the aerodynamic flow vibrations,
- can be arranged on already existing surfaces,
- be resistant to flow friction and to environmental action,
- operate in a wide temperature range;
- have a low aerodynamic drag, i.e. do not spoil substantially the air flow.

According to a first aspect of the invention, the first object is achieved by the method for interfacing a pilot with the aerodynamic state of the surfaces of an aircraft comprising the steps of:

- arranging an array of airflow boundary layer state sensors on the aerodynamic surfaces of an aircraft;
- connecting the array of sensors with an electronic sorting means;
- connecting the electronic sorting means with a tactile sensations actuating means provided in a body interface suitable for acting on the skin of the pilot;
- direct transmitting through the electronic sorting means a feedback of tactile sensations actuating signals that generate corresponding tactile sensations to said pilot responsive to signals of airflow boundary layer state of said aerodynamic surfaces.

In a preferred embodiment sensors are arranged on different aerodynamic surfaces of the aircraft and in different areas of a same aerodynamic surface. The tactile sensations actuating means of the body interface are sorted in groups, each group corresponding to a different aerodynamic surface and/or area of an aerodynamic surface. Furthermore, each group is located in a different portion of the body interface, whereby the pilot is capable of correlating the tactile sensations with the surface and/or area from which each signal is coming.

According to another aspect of the invention, an body interface, which can be used by the pilot to obtain the direct sensorization of the conditions of the aerodynamic surfaces of an aircraft during the flight, comprises a body interface in which are arranged tactile sensations actuating means suitable for acting on the skin of the pilot.

Preferably said tactile sensations actuating means are sorted in groups, each group being linked through electronic sorting means to the array of boundary layer state sensors arranged on different aerodynamic surfaces and/or area of an aerodynamic surface. Each group is located in a different portion of the body interface, whereby the pilot is capable of correlating the tactile sensations with the surface and/or area from which each signal comes.

According to a further aspect of the invention, a sensor which can be used on the surfaces of aircrafts to carry out the above method has the characteristic of being a microphone suitable for measuring the presence of relevant and disorganized peaks of the pressure waves representing the turbulent flow.

Advantageously, said microphone comprises a piezoelectric unimorphous membrane element. According to a particular embodiment said piezoelectric unimorphous element is linked to a an airflow activated vibrating mechanical element, or to a resilient plate, or to a tuft or ribbon, or to a block with resonant shape, etc.

Alternatively, the sensor comprises a piezoelectric tuft or is a Hall effect sensor associated to a flexible element comprising a magnet and arranged on the surface of the aircraft.

Further alternatively, the sensor comprises a force or. displacement detecting sensor-advantageously a piezoelectric element-linked to an aerodynamic flow induced vibrating mechanical element, or to a resilient plate, or to a tuft (tuft or ribbon), or to a block with resonant shape, etc.

BRIEF DESCRIPTION OF THE DRAWINGS

Further characteristics and advantages of the method and of the equipment according to the present invention will be made clearer with the following description of an embodiment thereof, exemplifying but not limitative, with reference to attached drawings wherein.

DESCRIPTION OF THE PREFERRED EMBODIMENT

Figure 1:
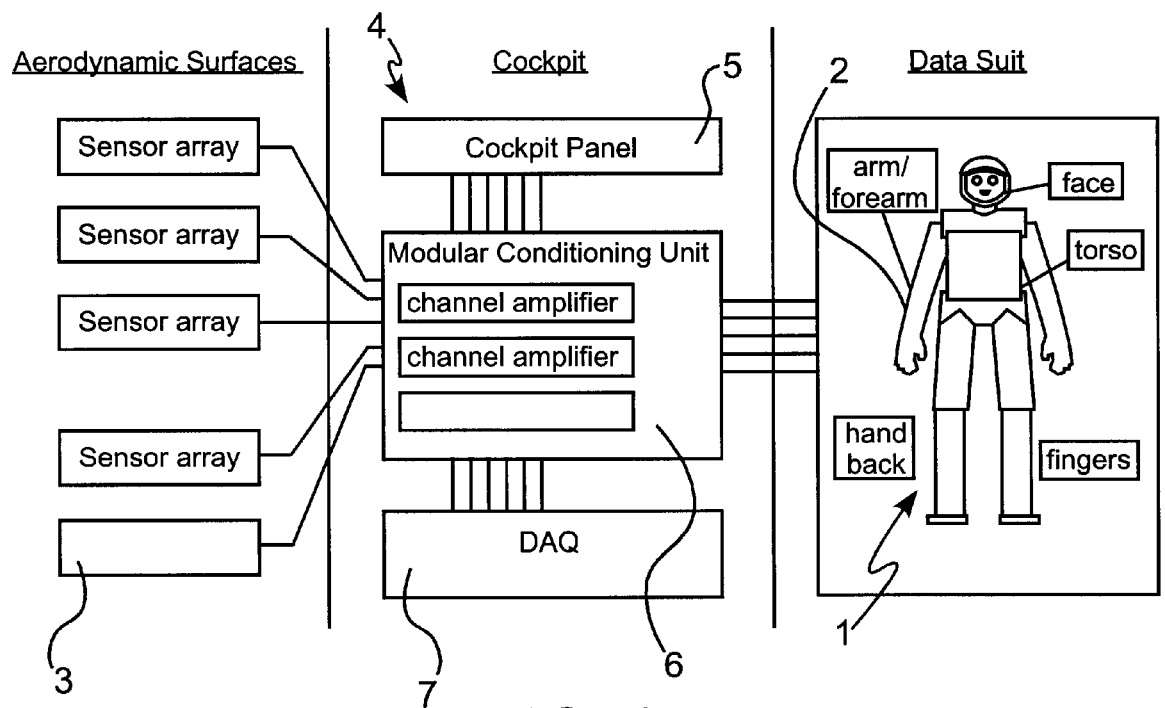
FIG. 1 shows a human with black highlighted zones of the body which can wear a data suit according to the invention, and a block diagram of the method according to the present invention.

With reference to FIG. 1, according to the present invention, the boundary layer state of the aerodynamic surfaces of an aircraft is detected directly by the pilot, who is shown diagrammatically as a human shape on the right and indicated with 1.

In particular, pilot 1 is wearing one or several "data suit", for example on the arm, on the trunk, on the face, on the hands, indicated with 2 black highlighted.

The data from the boundary layer state are collected by a plurality of sensors 3 located on aircraft aerodynamic surfaces. An interface 4 comprising the console for the controls 5, a multi-channel conditioning unit 6 and a processor 7 for the data acquisition are connected to the data suit 2.

The data suit 2, then, transmits to pilot 1, for example by means of vibrations or electric signals detected as tactile sensations, information on any critical conditions at sensors 3 as hereinafter described.

Figure 2:
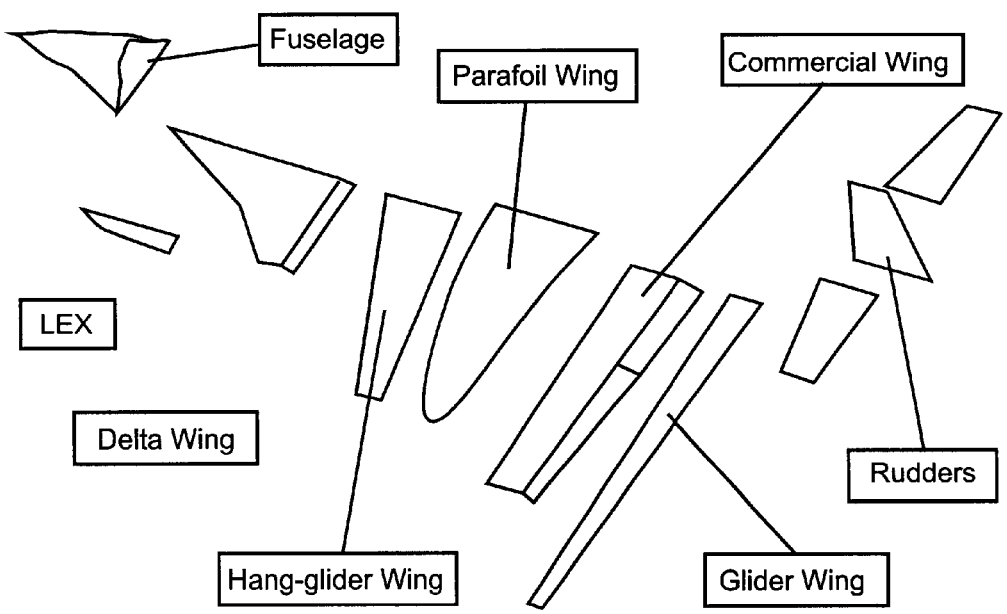
FIG. 2 shows the kind of surfaces of an aircraft.

As shown in FIG. 2, an aircraft, such as a military aircraft or an acrobatic aircraft, has many surfaces to which the present invention can be applied. On each surface critical conditions may be present that the pilot can at once detect directly.

Sensors 3, advantageously, are arranged on different aerodynamic surfaces of FIG. 2 and in different areas thereof. Therefore, data suit 2 has tactile sensations actuators sorted in groups so that each group corresponds to a different surface. For this reason, each group is located in a different portion of data suit 2 so that the pilot can correlate correctly the tactile sensations according to their origin from the aircraft.

In other words, the pilot and the aircraft are two entities directly interfaced to each other since the structure of the aircraft behaves as an exoskeleton with aerodynamic feedback to the pilot. A similar situation is present in animals that can fly with their body.

Figure 3:
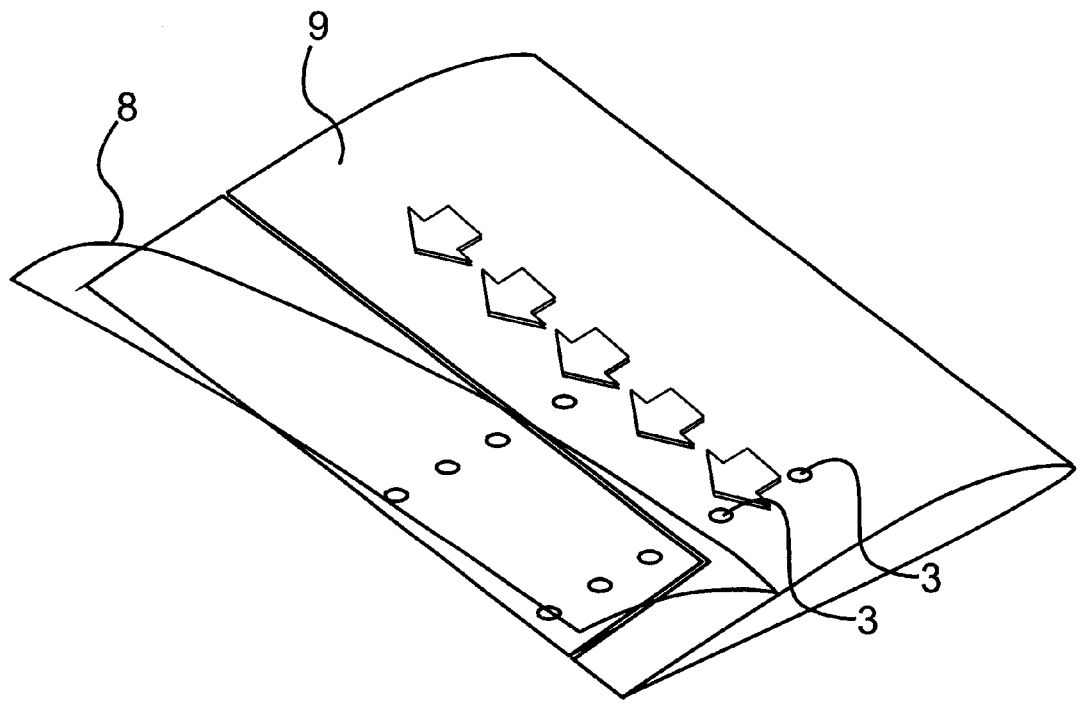
FIG. 3 shows a surface of an aircraft to which a plurality of boundary layer state sensors are arranged which are connected, in a way not shown, to the data suit of the block diagram of FIG. 1.

"Tactile sensation" is detected through sensors 3 located at suitable positions on the aerodynamic surfaces wherein the flow may indicate critical flight conditions. For example, the sensors can communicate local stall conditions or airflow detachments. In this case, as shown in FIG. 3, it is possible to arrange an array of sensors 3 orthogonally to the direction of the airflow detachment edge 8 from the aerodynamic surface 9.

Alternatively, sensors 3 can provide the magnitude of the side-slip, and in this case can be arranged symmetrically at two opposite sides of the fuselage or of the tail fin.

Furthermore, the total mapping of the sensors arranged on different surfaces is responsive to the air current through which the aircraft is flying. For example, during free flight the air state of a lifting air current may be detected.

Figure 4:
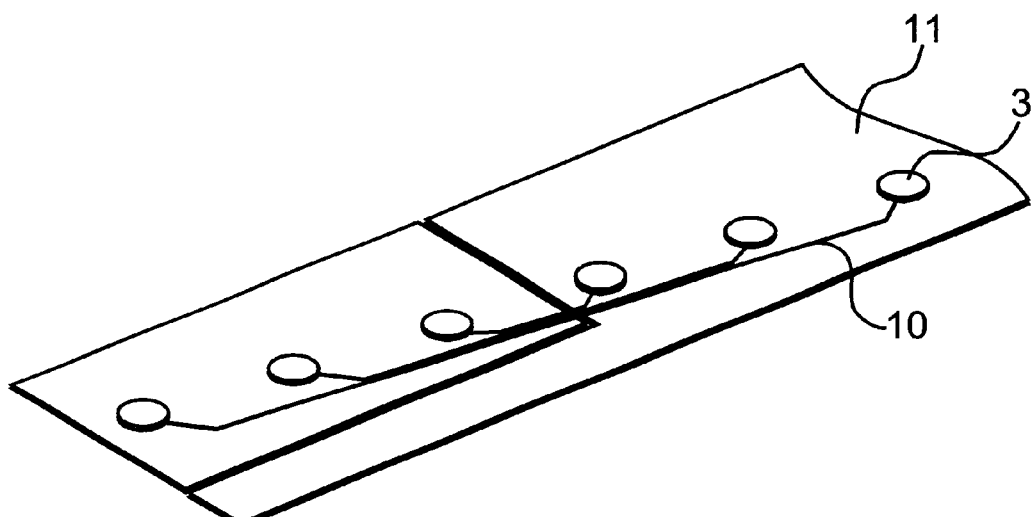
FIGS. 4 and 5 show respectively an assembly and an enlarged view of a example of cables of the sensors of FIG. 3 outside an aerodynamic surface.
Figure 5:
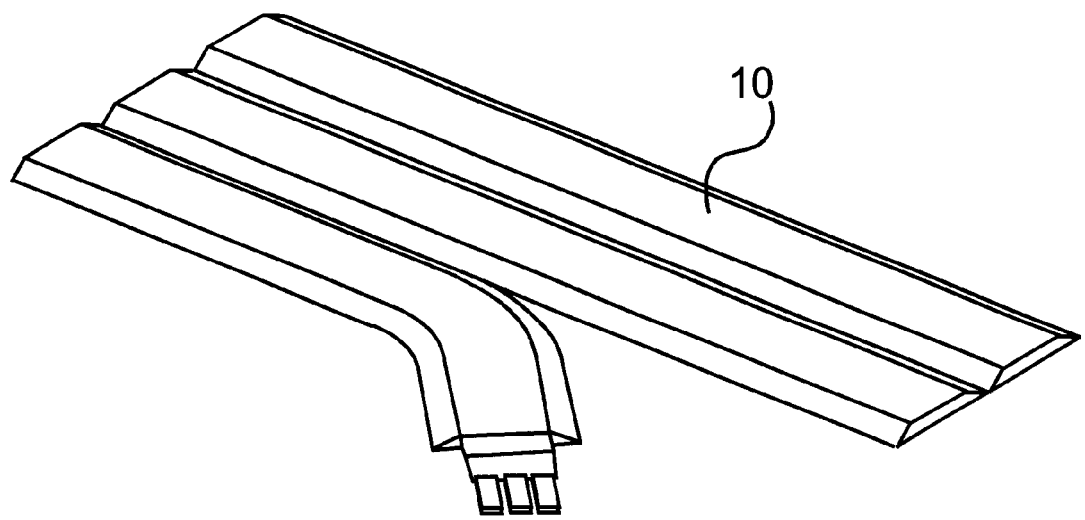

With reference to FIGS. 4 and 5, the cables of sensors 3 are arranged in order to not spoil the flow downstream of the sensors and have a cross section of minimum encumbrance. It is advisable to avoid arranging cables transversally to the flow and to take advantage of openings already existing between the outer and the inner surface walls of the aircraft, for example near flaps, slats, ailerons, without making new openings.

The cables can be advantageously executed with flexible printed circuits, or alternatively "flats" 10 (FIG. 5) electrically insulated and thermally shielded.

Advantageously, the cables are glued to the surface of the aircraft, by means of adhesive compounds or self sticking tapes.

For certain kinds of sensors, capable of transmitting the information through wall 11 (i.e. FIG. 7b or FIGS. 9a and 9b described hereinafter) only inner cables are necessary. The sensors are arranged so that the access is possible to the inner part of the wall. Advantageously, composite material aircraft walls can be provided wherein the cables are embedded in the structure.

Concerning the sensors 3, in FIGS. from 6 to 9 possible embodiments are shown.

Figure 6:
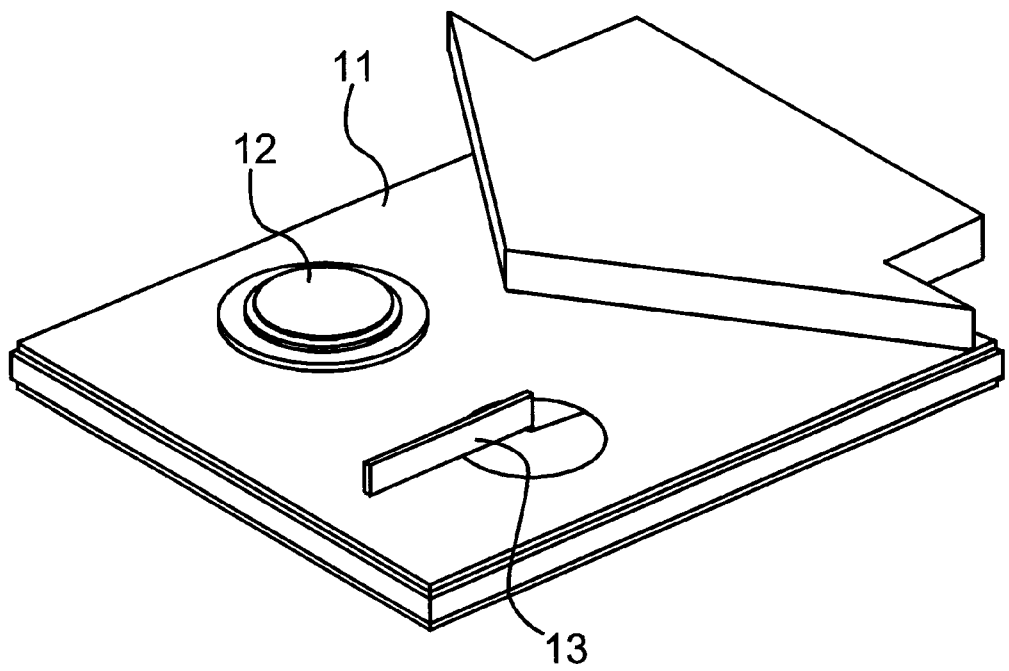
FIG. 6 shows a perspective view of a first and a second embodiment of boundary layer state sensor on a aerodynamic surface respectively comprising a) a piezoelectric unimorphous element used as noise transducer and b) by a plate of piezoelectric bimorphous element.

With reference to FIG. 6, a first embodiment a) comprises a membrane 12 of piezoelectric unimorphous element used as microphone and arranged directly on surface 11. The signal detected in the case of laminar or turbulent flow is clearly different, since the variations of local pressure are disorganized and have a remarkable amplitude in the case of turbulent flow, whereas the opposite happens with laminar flow.

Always with reference to FIG. 6, in a second embodiment, a plate 13 of piezoelectric bimorphous b) can be used as mechanical vibrations transducer activated by the turbulent flow near surface 11.

Figure 7A:
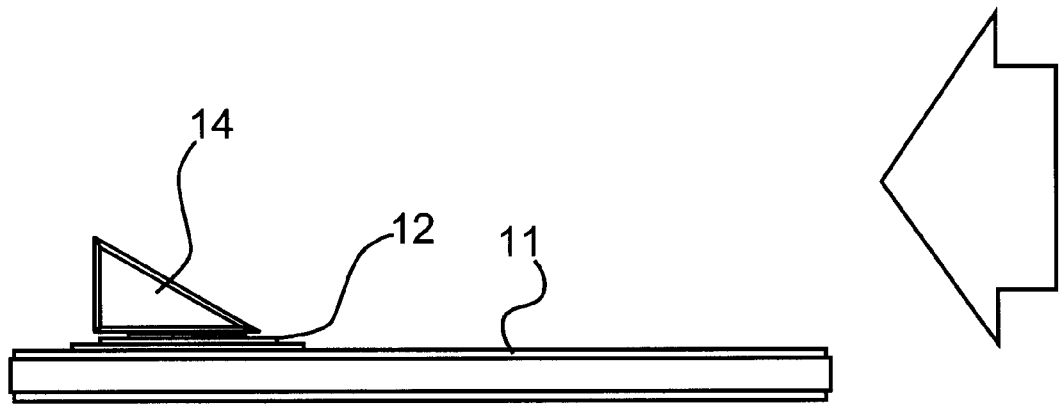
FIGS. 7a and 7b show respectively a cross sectional view and a perspective view of a third different embodiment having a sensor made of a membrane transducer such as a piezoelectric unimorphous element connected to a resonant tapered block.
Figure 7B:
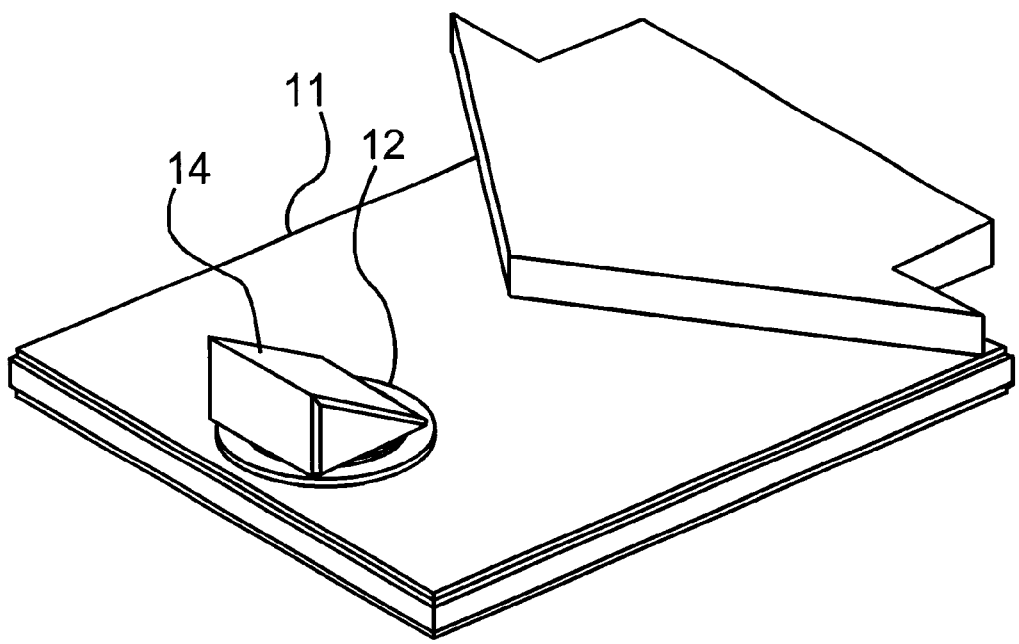

With reference to FIGS. 7a and 7b, a further thorough characterization of the signal cleaned from structural vibrations is obtained by a three-dimensional block integral to a piezoelectric sensor element 14. In fact it has a resonant and amplified response to the flow conditions in both laminar or turbulent flow, and can be connected directly to transducer 12.

With reference to FIGS. 8a to 8e, another kind of transducers uses "tufts", that are very easy to mount on a desired surface, semi-rigid wings, for example a hang glider, or non rigid surfaces (parafoil, etc.) without the need of particular adjustment.

Figure 8A:
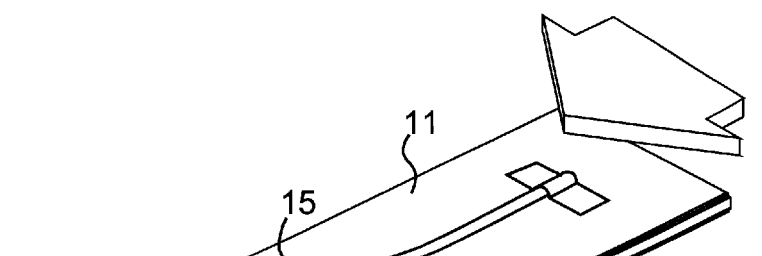
FIG. 8a shows a perspective view of a fourth embodiment of a boundary layer state sensor on an aerodynamic surface comprising a tuft made of a piezoelectric flexible cable.
Figure 8B:
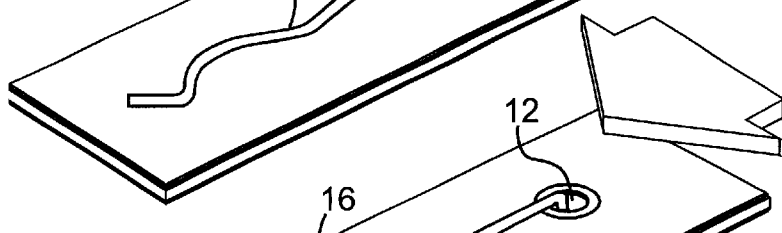
FIG. 8b shows a perspective view of a fifth embodiment of a boundary layer state sensor on a aerodynamic surface comprising a tuft linked to a membrane transducer such as a piezoelectric unimorphous element.
Figure 8C:
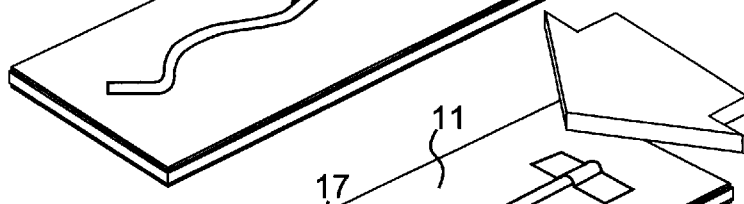
FIG. 8c shows a perspective view of a sixth embodiment of a boundary layer state sensor of a aerodynamic surface comprising a tuft with a tilt-switch or permanent magnet integral to the free end and associated Hall effect sensor.

In a fourth embodiment, FIG. 8a, there is a tuft 15 consisting in a piezoelectric flexible cable. In the case of FIG. 8b, a fifth embodiment of the sensor comprises a tuft 16 linked to a membrane transducer 12 such as a piezoelectric unimorphous element. In FIG. 8c, moreover, a sixth embodiment comprises a tuft 17 with a tilt-switch 18 or permanent magnet integral to the free end and Hall effect sensor 19 located below aircraft surface 11. The embodiment of FIG. 8c is effective since only a qualitative signal is sufficient, i.e. oscillating conditions of on/off type as resulting from the position of the tilt-switch 18 or of the permanent magnet switch.

Figure 8D:
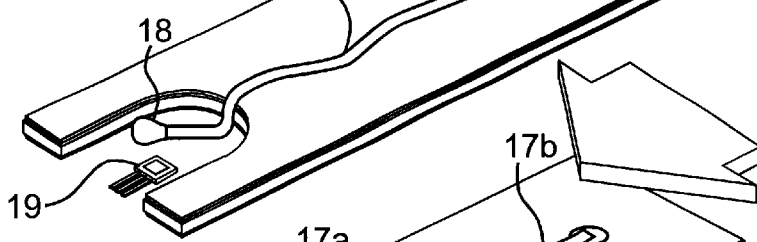
FIG. 8d shows a perspective view of a further embodiment of a boundary layer state sensor of an aerodynamic surface comprising a tuft or ribbon linked to a displacement or force transducer such as a piezoelectric bimorphous element.

As shown in FIG. 8d a tuft or ribbon 17a has a displacement or force transducer 17b, such as a piezoelectric bimorphous element. This way, the piezoelectric bimorphous element detects both the displacement and the forces on the tuft. Moreover, tuft 17a can stay very close to the aircraft surface 11.

Figure 8E:
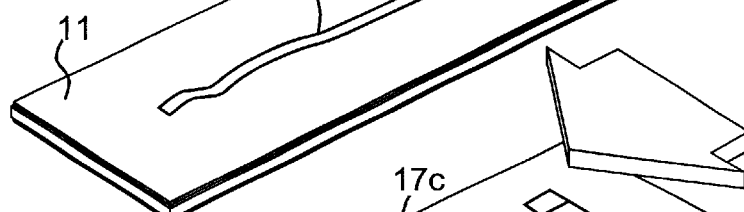
FIG. 8e shows a perspective view of a still further embodiment of a boundary layer state sensor of an aerodynamic surface comprising a tuft or ribbon carrying a mass at a certain length ratio upon its surface, said mass actuating over a pressure pad transducer such as a piezoelectric pad.

Alternatively, as shown in FIG. 8e, a tuft or ribbon 17c carries a mass 17d at a certain length of its surface. Mass 17d hits on a pressure pad transducer 17e, such as a piezoelectric pad. This way the signal responsive to the mechanical force developed by the hits is high enough that not only may not need amplification, but provides remarkably high wave peaks.

Figure 9A:
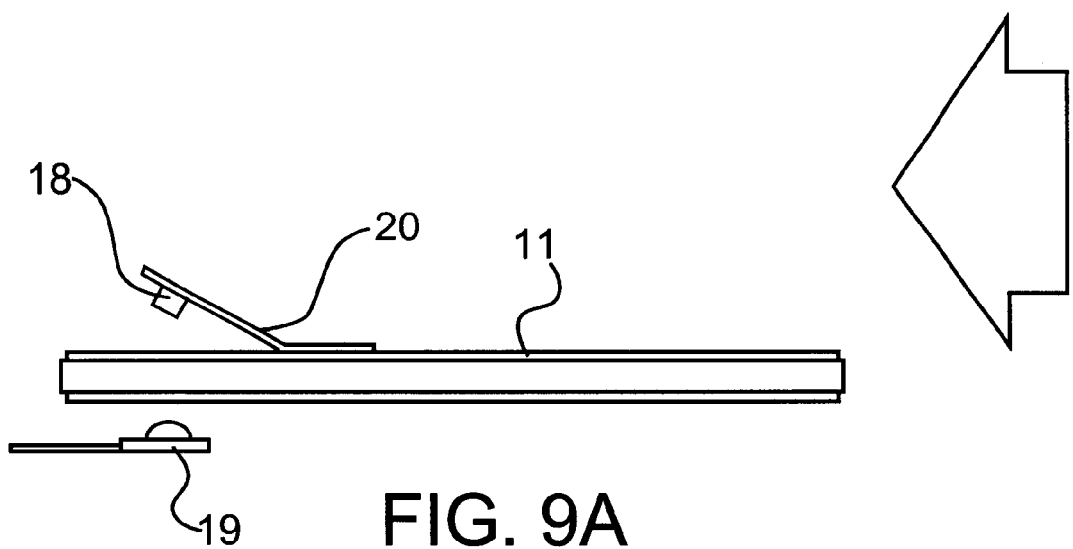
FIGS. 9a and 9b show respectively a cross sectional view and a perspective view of a seventh embodiment of a boundary layer state sensor on an aerodynamic surface comprising a vibrating plate integral to a permanent magnet and associated to an Hall effect sensor.
Figure 9B:
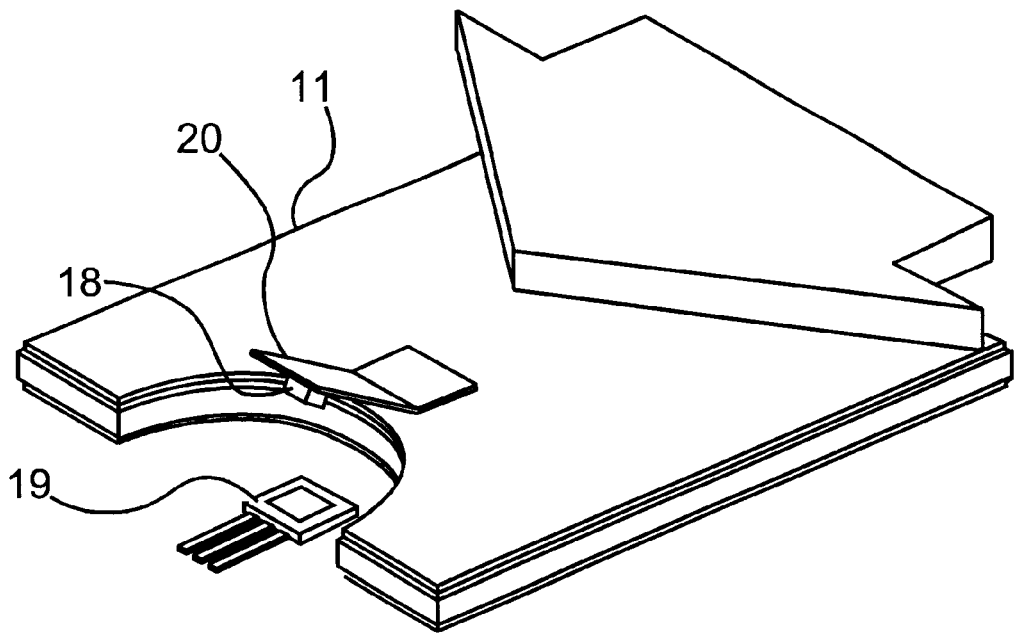

In a seventh embodiment a microchip is provided with an accelerometer, or tilt-switch, or permanent magnet 18, which is integral to the airplane surface by means of a plate 20, associated to a Hall effect sensor, or permanent magnet switch 19 (FIGS. 9a and 9b). The latter embodiment allows the signals to pass through the airplane surface, since the magnetic field can cross the relatively thin wall and reach the sensor located behind it, provided the wall is not made of ferromagnetic material, like most of aeronautical structures, which are normally made of aluminium, titanium or composite material).

The sensors above described, then:
are not complex;
are capable of providing clearly distinct information in the case of either laminar or turbulent flow;
they naturally filter the structural vibrations;
they can be mounted on already existing structures;
they resist to the airflow friction force;
they resist to the environmental agents within a wide temperature range;
have low drag weight, i.e. they do not spoil significantly the airflow.

Obviously, other equivalent types transducer (capacity sensors, electromagnetic sensors, etc) in addition to those exemplified above can be used.

The signal sorting and conditioning group, where the signal coming from the boundary layer state sensors is controlled and conditioned, is not described in detail since it is obvious for a man skilled in the art. In fact it has to condition an already strongly characterized signal. Therefore, the sorting and conditioning group is substantially a multi-channel amplifier, i.e. it has mainly the task of amplifying the signals for the transducers in the data suit. Threshold and amplitude controls are provided on every channel for adjusting the whole system on the particular installation. In other words the input/output intensity of the sensors have to be adjusted as a function of their position on the aerodynamic structure as well as for setting the data suit.

If the signal with turbulent airflow is of the logic unsteady type (such as for tilt-switch or Hall effect switch) and a bistable tactile transducer is provided in the data suit (completely deflected membrane in two opposite states, magnetic actuator with only two positions, etc.), the control is simplified further.

A data acquisition system, for example a A/D multi-channel converter and standard interface can be useful for recording and/or monitoring the data in parallel to the direct sensorization on the pilot.

Figure 10:
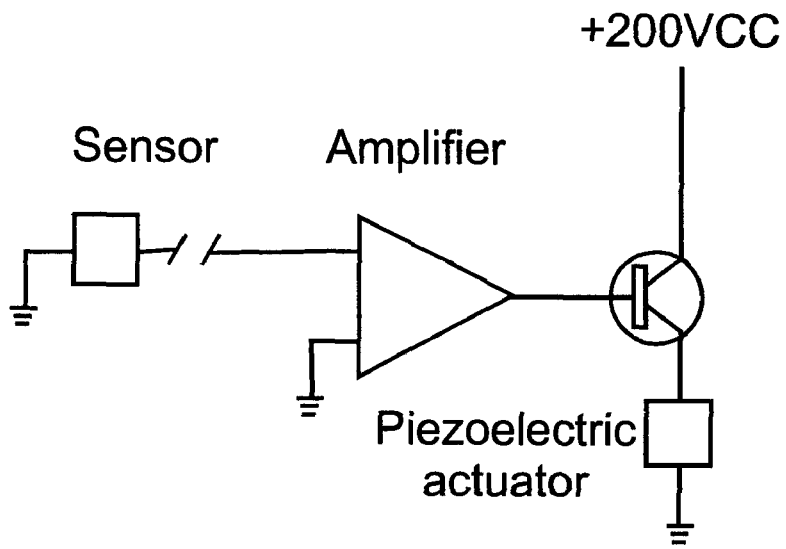
FIGS. 10 and 11 show a block diagram of two possible embodiments of electronic circuit interfacing a tactile sensations piezoelectric actuator with the boundary layer state sensors of FIG. 3.
Figure 11:
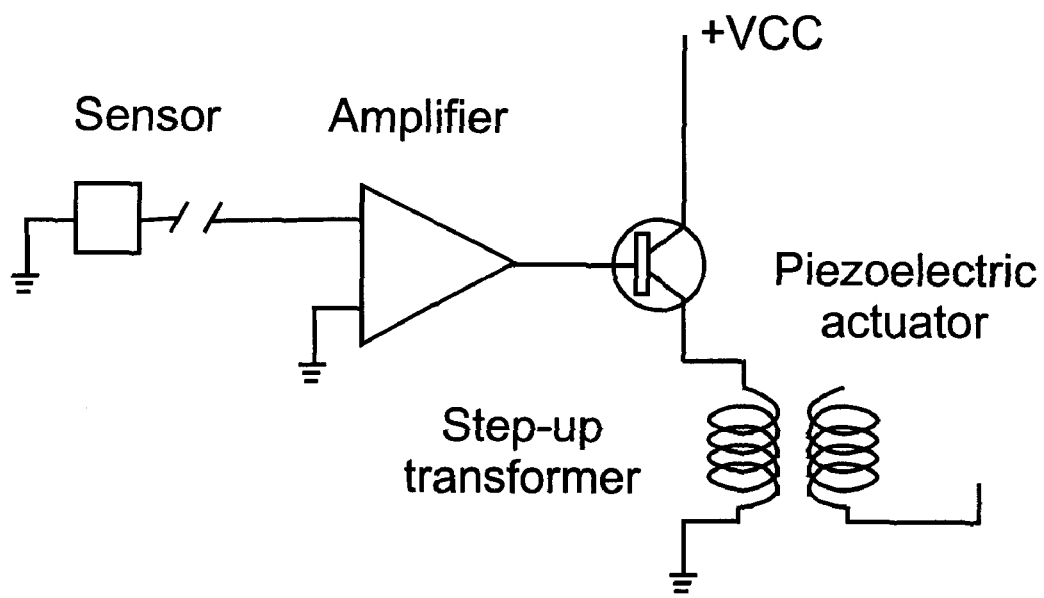

In FIGS. 10 and 11 two not complex circuits are exemplified interfacing sensors 3 with the transducers of data suit 2.

Figure 12:
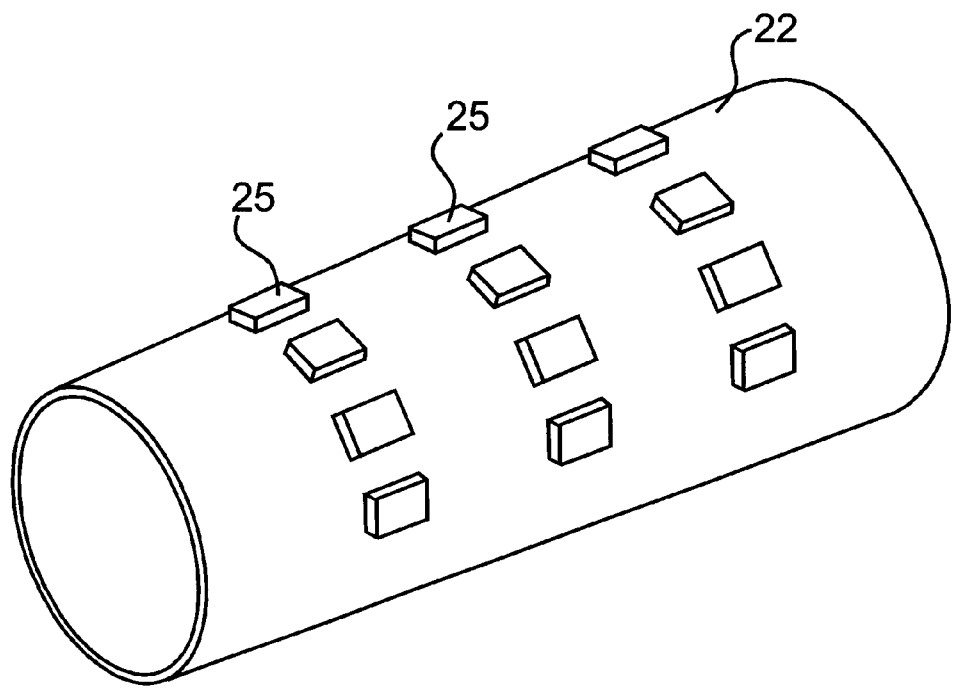
FIGS. 12, 13 and 14 show a perspective view of a data suit respectively a sleeve, a glove and a mask, comprising a plurality of tactile sensations actuators.
Figure 13:
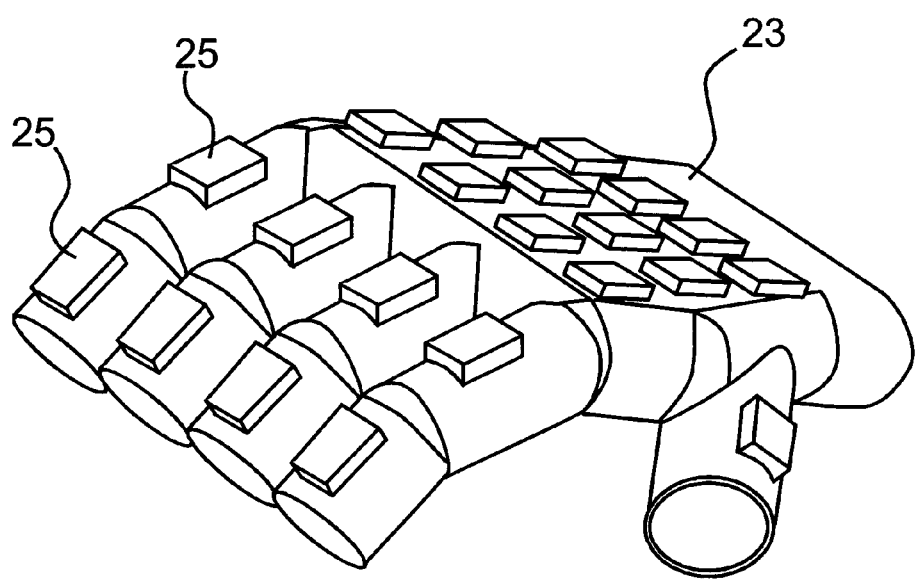
Figure 14:
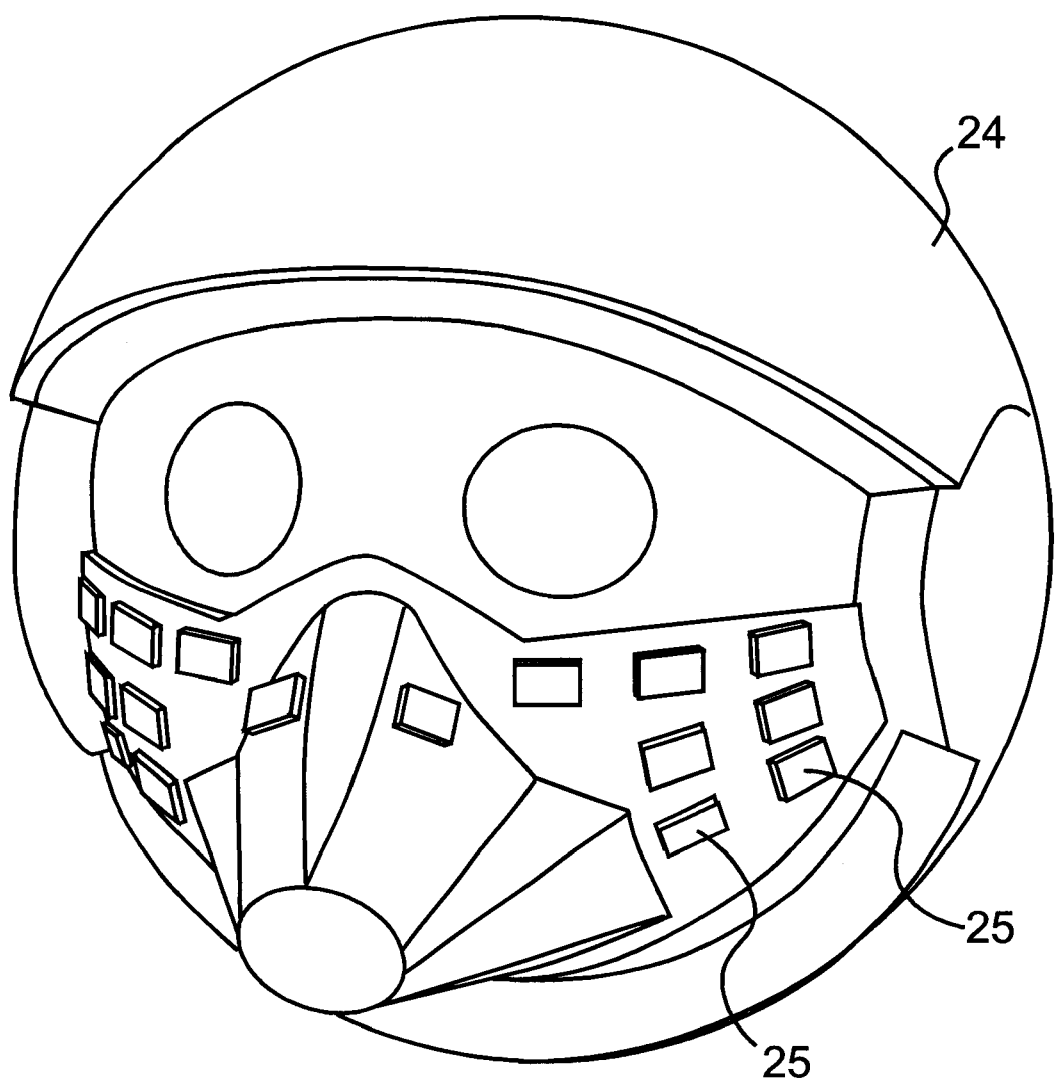

With reference to FIGS. 12, 13 and 14, three examples of data suit comprise respectively a sleeve 22, a glove 23 and a mask 24 comprising a plurality of transducers 25 having, internally, a contact surface for the tactile interaction with the pilot.

Figure 15:
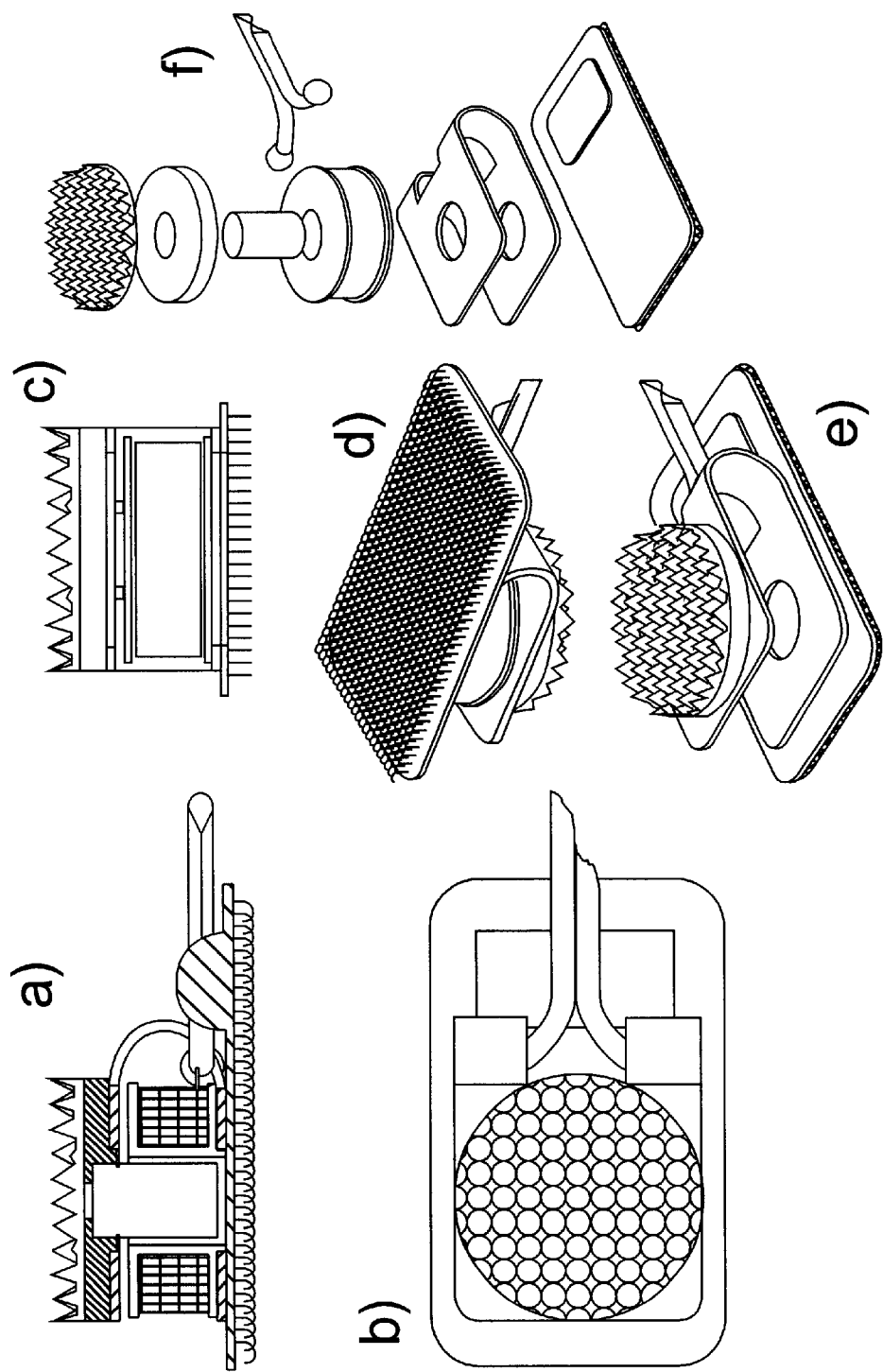
FIG. 15 shows electromagnetic tactile sensations actuators and respectively a) cross sectional longitudinal view, b) top plan view, c) cross sectional view, d) perspective view from the above, e) perspective view from below and f) perspective exploded view.

Concerning the data suit transducers, they can be of the electromagnetic type, such as linear, rotative, oscillating, etc. An example of linear electromagnetic transducer is given in FIG. 15, which can be made with molded plastic elements, comprising a ferromagnetic element that urges against a coil crossed by electric signal coming from the sensors. A C-shaped spring holds them together and supports the tactile surface or "effector" that touches the pilot. On the other side of the effector there is a fastening surface on the data suit, such as a "velcro" fastening element.

Figure 16:
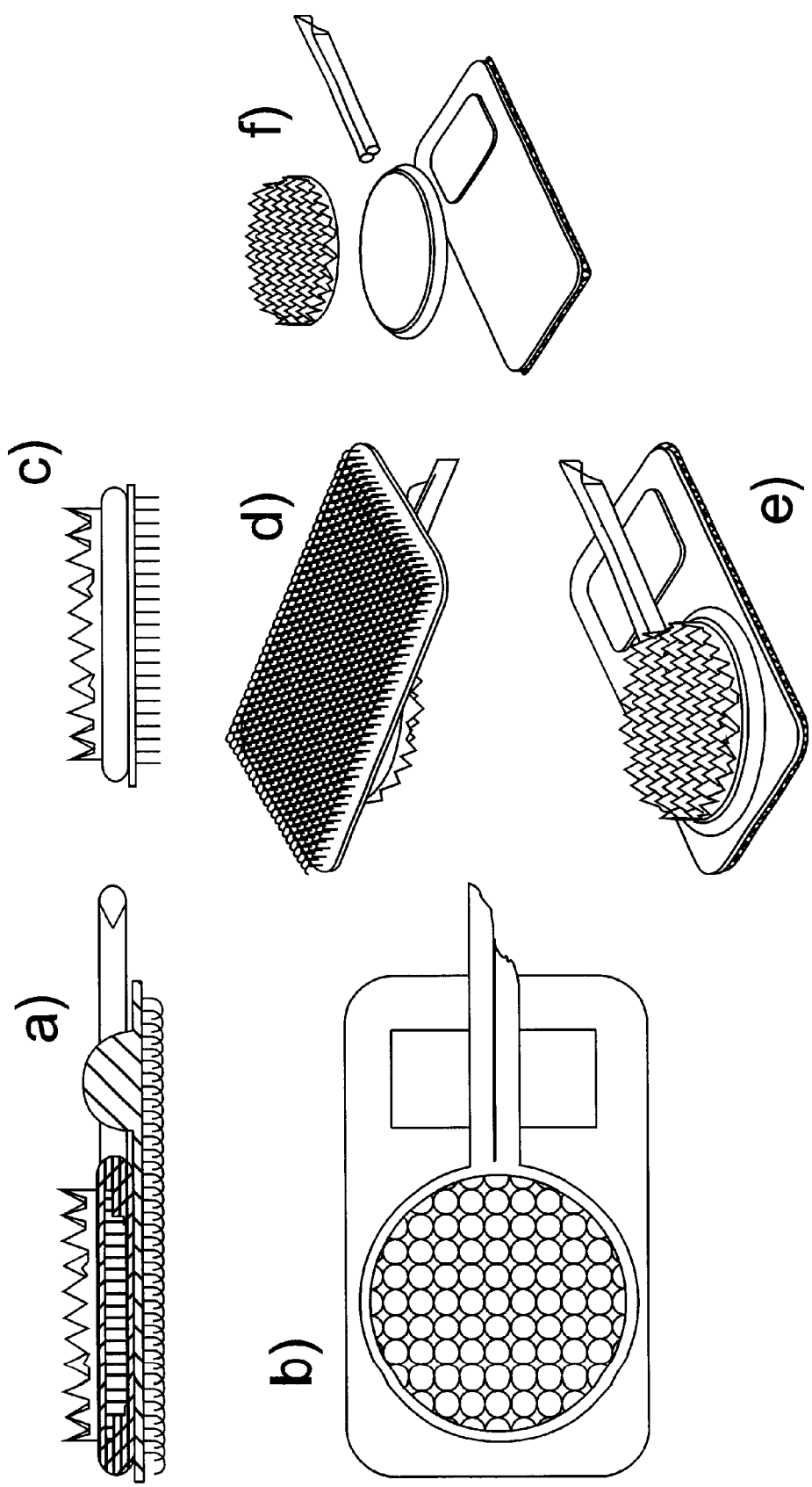
FIG. 16 shows piezoelectric tactile sensations actuators, precisely a) a cross sectional longitudinal view, b) top plan view, c) cross sectional view, d) perspective view from the above, e) perspective view from below and f) perspective exploded view.

Alternatively, the tactile sensation actuator comprises a piezoelectric vibrator (FIG. 16). The vibrator comprises a membrane directly operated by the electrical signal and provides a vibrating force orthogonal to its surface. In particular, with unimorphous elements similar to those used as sensors vibrating membranes can be obtained of minimum thickness, easily applicable in non complex data suits. With the voltage used in the latter case the piezoelectric transducers is completely covered with sealing resin that transmits without any substantial attenuation the vibration to the pilot skin.

Figure 17:
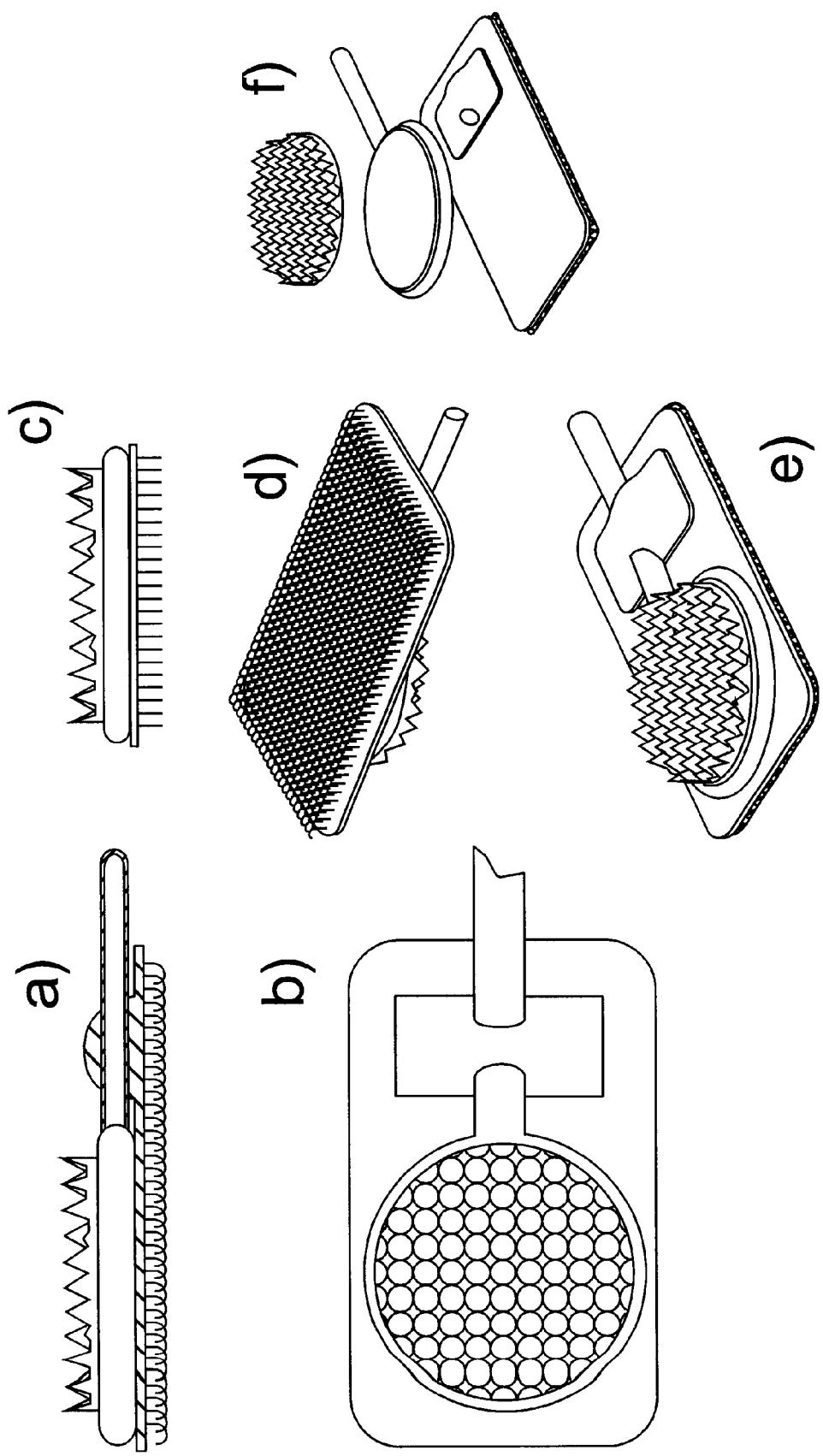
FIG. 17 shows pneumatic tactile sensations actuators, respectively a) cross sectional longitudinal view, b) top plan view, c) cross sectional view, d) perspective view from the above, e) perspective view from below and f) perspective exploded view.

Another embodiment of direct transmission of the vibration is carried out through fluid means, for example pneumatically: the transducers can be of different types, such as in particular a small inflatable balloon (FIG. 17), contained between the skin and the data suit, which vibrates according to the pressure proportional to the signal. An interface unit converting the electrical signal into pneumatic signal is integrated in the sorting-conditioning unit. Flexible thin communication tubes are provided in the data suit.

Moreover, other tactile sensations actuators can be used of the type providing air jets or microelectric signals.

Furthermore, other types of tactile transducers are also available on the market.

The data suit and the relative vibration transducers according to the invention are then capable of:
covering the body areas onto which the tactile information is delivered.
being of minimum encumbrance and thickness;
fitting with the pilot body;
allowing a completely free movement to the pilot.

Alternatively to the data suit, a body interface may also be provided through handles, seats or other devices contacting the pilot's body, wherein the tactile sensations transducers are housed. For example, they can be integrated in devices handled by the pilot, such as control stick, throttle lever, etc.

The foregoing description to specific embodiment will so fully reveal the invention according to the conceptual point of view, so that others, by applying current knowledge, will be able to modify and/or adapt for various applications such as embodiment without further research and without parting from the invention, and it is therefore to be understood that such adaptations and modifications will have to be considered as equivalent to the specific embodiment. The means and the material to realize the different functions described herein could have different nature without, for this reason, departing from the field of the invention. It is to be understood that the phraseology or terminology employed herein is for the purpose of description and not of limitation.

What is claimed is:

1. A method for interfacing a pilot with the aerodynamic state of the surfaces of an aircraft, in particular allowing the direct sensorization of the conditions of the aerodynamic surfaces during the flight, comprising the steps of:
arranging arrays of boundary layer sensors on predetermined aerodynamic surfaces of an aircraft, wherein said sensors are arranged on different aerodynamic surfaces and in different areas of a same aerodynamic surface, said sensors emitting signals responsive to the aerodynamic conditions on said surfaces;
connecting said arrays of sensors with an electronic sorting means;
providing a body interface equipment associated to the pilot;
providing a plurality of tactile sensations actuating means housed in said body interface, said tactile sensations actuating means being sorted in said body interface to correspond each to a different aerodynamic surface and/or area of a same aerodynamic surface, each tactile sensations actuating means being located in a different portion of said body interface;
connecting said electronic sorting means with a tactile sensations actuating means housed in a body interface equipment associated to the pilot;
transmitting to said body interface through said electronic sorting means said signals responsive from said boundary layer sensors, whereby said actuating means in said body interface provides said tactile sensations to the pilot who is capable of correlating the tactile sensations with the surface and/or surface area from which each signal comes.

2. The method according to claim 1, wherein said tactile sensations actuating means of said body interface further comprises actuators that are sorted in groups, each group corresponding to a different aerodynamic surface and/or different areas of a same aerodynamic surface, each group being located in a different portion of said body interface.

3. A body interface which can be used by a pilot to obtain the direct sensorization of the conditions of the aerodynamic surfaces of an aircraft during the flight, comprising:
a body interface support having a plurality of portions associated to corresponding portions of skin of the pilot;
a plurality of tactile sensations actuating means arranged in said body interface, each tactile sensations actuating means corresponding to a different portion of the body interface;
said plurality of tactile sensations actuating means being connected through electronic sorting means to arrays of boundary layer state sensors, each array of boundary layer state sensors being arranged on a different aerodynamic surface and/or area of an aerodynamic surface of an aircraft, each tactile sensations actuating means receiving a signal through said electronic sorting means responsive to a different array of boundary layer state sensors, whereby the pilot is capable of correlating the tactile sensations with the surface and/or area of aerodynamic surface from which the signal comes.

4. The body interface according to claim 3, wherein said tactile sensations actuating means of said body interface comprises actuators that are sorted into groups, each group corresponding to a different aerodynamic surface and/or area of same aerodynamic surface, each group being located in a different portion of said body interface.

5. The body interface according to claim 4, wherein said actuators are chosen from the group of transducers consisting of electromagnetic, piezoelectric, pneumatic, air jet, and microelectric transducers.

6. Sensors which can be used on the surfaces of an aircraft to carry out the method according to claim 1 comprising:
a plurality of boundary layer state sensors wherein said sensors are arranged on different aerodynamic surfaces and in different areas of a same aerodynamic surface;
said sensors having means for detecting variations of local pressure in the passage from laminar to turbulent airflow;
said detecting means having means for providing signals responsive to disorganized peaks of pressure waves representing the turbulent flow.

7. The sensors of claim 6 wherein said means for detecting variations of local air pressure in the passage from laminar to turbulent airflow comprises a microphone.

8. The sensors of claim 7, wherein said microphone comprises a piezoelectric unimorphous membrane element.

9. The sensors according to claim 8, wherein said piezoelectric unimorphous element is linked to an element chosen from the group consisting of a vibrating mechanical element, a metal plate, a tuft, and a block with resonant shape.

10. The sensors of claim 6 wherein said means for detecting variations of local air pressure in the passage from laminar to turbulent airflow comprises a Hall effect sensor associated to a flexible element connected to the surface of the aircraft.

11. The sensors of claim 6 wherein said means for detecting variations of local air pressure in the passage from laminar to turbulent airflow comprises a piezoelectric tuft.

* * * * *